United States Patent [19]

Dotson et al.

[11] 4,303,624
[45] Dec. 1, 1981

[54] PURIFICATION OF ALKALI METAL CHLORIDE BRINES

[75] Inventors: Ronald L. Dotson, Cleveland; Richard W. Lynch, Chattanooga, both of Tenn.

[73] Assignee: Olin Corporation, New Haven, Conn.

[21] Appl. No.: 186,930

[22] Filed: Sep. 12, 1980

[51] Int. Cl.³ .............................................. C01D 3/04
[52] U.S. Cl. .................... 423/184; 210/666; 210/725; 210/729; 423/499; 562/590; 562/593; 562/597
[58] Field of Search .............. 210/729, 666, 725; 423/158, 184, 499; 562/590, 593, 597

[56] References Cited

U.S. PATENT DOCUMENTS

| | | | |
|---|---|---|---|
| 4,038,365 | 7/1977 | Patil et al. | 423/161 |
| 4,060,465 | 11/1977 | Yokota et al. | 204/128 |
| 4,078,978 | 3/1978 | Zirngiebl | 204/98 |
| 4,078,978 | 3/1978 | Zirngiebl | 423/157 |
| 4,119,508 | 10/1978 | Yokota et al. | 204/128 |
| 4,155,820 | 5/1979 | Ogawa et al. | 204/98 |
| 4,176,022 | 11/1979 | Darlington | 204/98 |
| 4,183,900 | 1/1980 | Lee et al. | 423/157 |
| 4,190,505 | 2/1980 | Ogawa et al. | 204/98 |
| 4,207,152 | 6/1980 | Kadija et al. | 204/98 |

FOREIGN PATENT DOCUMENTS

| | | | |
|---|---|---|---|
| 684998 | 4/1964 | Canada | 423/184 |
| 3902 | of 1909 | United Kingdom | 562/597 |
| 7902 | of 1910 | United Kingdom | 562/597 |

Primary Examiner—O. R. Vertiz
Assistant Examiner—Wayne A. Langel
Attorney, Agent, or Firm—William D. Sabo

[57] ABSTRACT

A method of purifying alkali metal chloride brine containing calcium ion impurities which comprises adding to the brine a proportion of an alkali metal carboxylate compound to form an insoluble calcium carboxylate precipitate, separating the insoluble carboxylate precipitate from the brine to purify the brine and recovering the resulting purified brine. The alkali metal carboxylate compound has the formula:

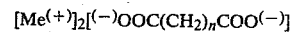

$$[Me^{(+)}]_2[^{(-)}OOC(CH_2)_nCOO^{(-)}]$$

wherein Me is an alkali metal and n is an integer from 0 to 6.

8 Claims, No Drawings

PURIFICATION OF ALKALI METAL CHLORIDE BRINES

This invention relates to improvements in the purification of alkali metal chloride brines. More particularly, it concerns an improved method for removing calcium ion impurities from alkali metal chloride brines.

Alkali metal chloride brines are used in the electrolytic production of chlorine and alkali metal hydroxides in electrolytic cells having an anolyte compartment separated from a catholyte compartment by a barrier which is either a diaphragm or a membrane. Raw brines usually contain varying amounts of calcium ion impurities, and it is well known that the presence of significant quantities of such impurities can deleteriously affect the operation of the cell and degrade the physical integrity of the barrier. Thus, prior to introducing an alkali metal chloride brine into an electrolytic cell containing either a diaphragm or a membrane, it is desirable to remove or reduce the calcium ion impurities content. Successful operation of diaphragm and membrane cells demands careful control of brine purity.

It is known to reduce calcium ion impurities in an alkali metal chloride brine by the addition to the brine of an alkali metal carbonate to form an insoluble calcium carbonate precipitate which is thereafter separated from the brine. Although this approach is effective in reducing the calcium ion impurities content, there is a need in the art for a process which achieves a greater removal of calcium ion impurities from the brine.

The use of alkali metal carbonates is also unsatisfactory in that the addition of a sufficient amount of these compounds to achieve satisfactory calcium ion impurities reduction raises the pH of the brine. After the calcium carbonate precipitate is filtered from the alkali metal chloride solution, the pH of the solution must be lowered, and there is a possibility of contamination of the purified brine through use of an impure acid. Thus, a need exists for a process which substantially reduces calcium ion impurities, and which can accomplish this while avoiding the necessity for adjustment of the pH of the brine subsequent to treatment.

It is a primary object of this invention to provide an improved method for reducing calcium ion impurities in alkali metal chloride brines.

It is a further object of the invention to provide a method of removing calcium ion impurities from alkali metal chloride brines to be fed to electrolytic cells containing either a diaphragm or a membrane for the production of chlorine.

It is yet another object of the invention to provide a method for reducing calcium ion impurities in alkali metal chloride brines and to accomplish the reduction without requiring a pH adjustment step after the brine is treated.

These and other objects will be apparent from the following description of the invention.

It has now been discovered that the foregoing objects are accomplished when an alkali metal chloride brine containing calcium ion impurities is reacted with an alkali metal carboxylate compound to form an insoluble calcium carboxylate precipitate. Upon separation of the precipitate from the brine, the treated brine may be used as feed to electrolytic processes for the production of chlorine.

More in detail, any alkali metal chloride brine containing calcium ion impurities can be treated in accordance with the process of this invention. Typical examples of alkali metal chlorides are sodium chloride, potassium chloride and lithium chloride. In order to simplify the disclosure of the invention, it will be described hereinafter in terms of potassium chloride. While any solution of potassium chloride containing calcium ion impurities may be treated by the process of the present invention, the aqueous solutions treated typically contain from about 150 to about 330, and preferably contain from about 200 to about 310, grams of potassium chloride per liter.

The alkali metal chloride brines treated by the process of the present invention may contain any amount of calcium ion impurities. In a typical potassium chloride brine, the concentration of calcium ions present ranges generally from about 10 to about 1300, and usually from about 100 to about 500, parts per million.

Calcium ion impurities in potassium chloride brines are reduced by the addition of an alkali metal carboxylate compound or mixtures thereof. The carboxylate compounds utilized in the process of the present invention have the following general formula:

where Me is an alkali metal, preferably sodium or potassium, and where n is an integer from 0 to 6, preferably 0, 1 or 2. Typical examples of alkali metal carboxylate compounds which may be used are: sodium oxalate, potassium oxalate, sodium malonate, sodium succinate, potassium glutarate, and sodium adipate. The most preferred embodiments of the invention employ as a calcium ion removing agent either sodium oxalate, potassium oxalate or a mixture thereof.

Upon addition of the alkali metal carboxylate compound, an insoluble calcium carboxylate precipitate is formed as expressed by the following equation:

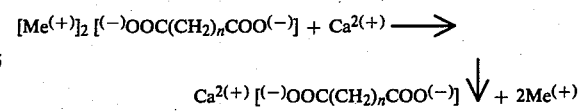

The calcium ion reducing proportion of alkali metal carboxylate added to the aqueous potassium chloride solution is dependent upon the concentration of calcium ion impurities in the brine. Suitable proportions of alkali metal carboxylate employed include, for example, a molar ratio of alkali metal carboxylate to calcium ion impurity present in the solution of from about 2:1 to about 20:1. Preferably, the molar ratio utilized in the practice of the process of the present invention ranges from about 2.1:1 to about 12:1.

The alkali metal carboxylate compound may be added to the brine in any suitable form including, for example, as granules or powders or as an aqueous solution. For convenience of handling, it is preferred to add the alkali metal carboxylate as an aqueous solution. The alkali metal carboxylate solution used may be of any desired concentration. Suitable alkali metal carboxylate solutions include, for example, those containing from about 100 to about 150 grams of alkali metal carboxylate per liter of solution.

The alkali metal carboxylate is added to the calcium ion impurity-containing brine at ambient temperature; however, the temperature of the brine solution is not critical and, if desired, higher or lower temperatures may be employed. Any suitable reaction time may be used to permit reaction of the calcium ion impurities with the alkali metal carboxylate; for example, a reaction time of from about 3 to about 30 minutes may be employed.

The insoluble calcium carboxylate precipitate which is formed is then physically separated from the brine using any suitable technique known to those skilled in the art, such as settling or filtration. After separation of the calcium carboxylate precipitate, the purified brine is recovered; and it generally contains less than about 1, and usually from about 0.5 to about 1, part per million of calcium ion impurities.

It is a particular advantage of the present invention, that a highly satisfactory calcium ion impurities removal is accomplished, without raising the pH of the brine to an unacceptable level for subsequent introduction to an electrolytic cell. However, it has been found that, if it is desired to further enhance the removal of calcium ion impurities, an increased removal can be achieved by raising the pH of the brine either during or after the addition of the alkali metal carboxylate. In this embodiment, a sufficient amount of an alkali metal hydroxide is added to raise the pH of the brine to at least about 12. Preferred embodiments of the invention employ as an alkali metal hydroxide either sodium hydroxide or potassium hydroxide.

The concentration of calcium ion impurities in the brine may be lowered still further. This is preferably achieved by contacting the brine, which has been treated with either alkali metal carboxylate alone or with both alkali metal carboxylate and alkali metal hydroxide, with an ion exchange resin, such as a chelating ion exchange resin. As an additional advantage of the present invention, it has been found that the use of an alkali metal carboxylate compound to treat the brine may increase the capacity of the ion exchange resin. While not fully understood, it is believed that carboxylate ions have a tendency to settle in the resin, and that the settled carboxylate ions aid in the further removal of calcium ions.

It has also been found that the addition of alkali metal carboxylate reduces the concentration of alkali metal chlorate in the brine. Removal or reduction of the alkali metal chlorate level is desirable to prevent degradation or decomposition of ion exchange resin material employed in further brine treatment.

It should be noted also that the use of oxalate compounds is particularly preferred in that these compounds have the additional advantage of not leaving undesirable by-products in spent anolyte brine. It is believed that the oxalate in solution is converted to carbon dioxide in accordance with the following equation:

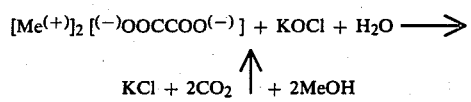

The following examples are presented to illustrate the invention more fully. All parts and percentages are by weight unless otherwise indicated.

EXAMPLE 1

To a reaction vessel containing 250 milliliters of an aqueous solution containing about 25 percent potassium chloride, a known amount of calcium ion impurities was added and dissolved. An aqueous solution of potassium oxalate was gradually added to the potassium chloride solution with stirring. The ensuing reaction was carried out at ambient temperature and was allowed to proceed for about 10 minutes. The insoluble impurities which formed were filtered, and the treated potassium chloride solution was then analyzed to determine the amount of remaining calcium. Table I below indicates the weight of potassium oxalate added, the weight of calcium present in the potassium chloride solution both before and after treatment, and the percent reduction of calcium originally present.

EXAMPLE 2

The procedure of Example 1 was followed except that to the reaction vessel, an amount of 45 percent potassium hydroxide solution sufficient to raise the pH of the potassium chloride solution to about 12 was added. Table I summarizes the results.

COMPARATIVE EXAMPLES 1 AND 2

These comparative examples are provided to demonstrate the improvement of using an alkali metal carboxylate to treat an alkali metal chloride brine to reduce calcium ion impurities in the brine. In Comparative Example 1, the procedure of Example 1 was followed, and in Comparative Example 2, the procedure of Example 2 was followed, except that in each comparative example an aqueous solution of potassium carbonate, instead of an aqueous solution of potassium oxalate, was added to the potassium chloride solution. The results from both comparative examples are summarized in Table II.

Table I shows that potassium oxalate was substantially better than potassium carbonate in removing calcium ion impurities. When potassium hydroxide was introduced, potassium oxalate was still substantially better than potassium carbonate in removing calcium ion impurities.

TABLE I

| Example No. | Grams $K_2C_2O_4$ | Parts per million $Ca^{++}$ (untreated KCl solution) | Parts per million $Ca^{++}$ (treated KCl solution) | Percent $Ca^{++}$ reduction |
|---|---|---|---|---|
| 1 | 1.2 | 27.2 | 0.750 | 97.2 |
| 2 | 1.2 | 27.2 | 0.532 | 98.0 |

TABLE II

| Comparative Example No. | Grams $K_2CO_3$ | Parts per million $Ca^{++}$ (untreated KCl solution) | Parts per million $Ca^{++}$ (treated KCl solution) | Percent $Ca^{++}$ reduction |
|---|---|---|---|---|
| 1 | 1.2 | 27.2 | 1.07 | 96.1 |
| 2 | 1.2 | 27.2 | 0.781 | 97.1 |

What is claimed is:

1. A method of purifying alkali metal chloride brine containing calcium ion impurities for introduction into an electrolytic cell having an anolyte compartment separated from a catholyte compartment by a barrier which is a membrane, comprising the steps of:
  (a) adding to said brine a proportion of an alkali metal oxalate compound to form an insoluble calcium oxalate precipitate;
  (b) separating said insoluble oxalate precipitate from said brine to purify said brine;
  (c) recovering the resulting purified brine; and
  (d) contacting said purified brine with an ion exchange resin to further reduce the content of calcium ions in said purified brine.

2. The method of claim 1, wherein said brine has an alkali metal chloride content of from about 200 to about 310 grams per liter.

3. The method of claim 2, wherein said brine contains from about 100 to about 500 parts per million of calcium ion impurities.

4. The method of claim 3, wherein said alkali metal chloride is selected from the group consisting of sodium chloride and potassium chloride.

5. The method of claim 4, wherein said proportion is a molar ratio of said alkali metal oxalate compound to said calcium ion impurities of from about 2.1:1 to about 12:1.

6. The method of claim 1, wherein an alkali metal hydroxide is added to said brine in an amount sufficient to raise the pH of the brine to at least about 12, said alkali metal hydroxide being added to said brine prior to separating said oxalate precipitate from said brine.

7. The method of claim 6, wherein said alkali metal hydroxide is selected from the group consisting of sodium hydroxide and potassium hydroxide.

8. The method of claim 1, wherein said alkali metal oxalate compound is selected from the group consisting of sodium oxalate, potassium oxalate and mixtures thereof.

* * * * *